May 19, 1925.                                           1,538,734
                         H. C. ODEN
                  MILKING MACHINE APPARATUS
                   Filed Aug. 27, 1919      2 Sheets-Sheet 1
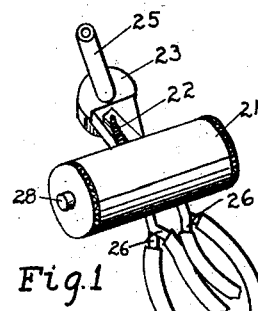
Fig.1
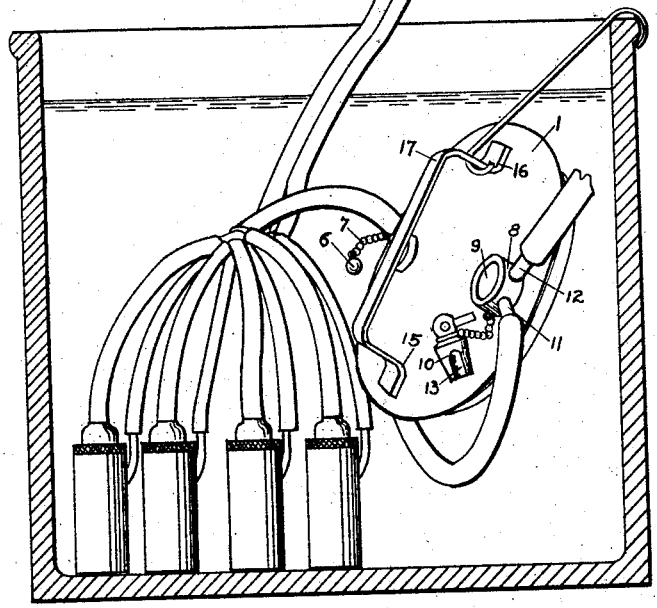
Henry Clyde Oden
        INVENTOR.
BY Edwin P. Corbett
        ATTORNEY.

May 19, 1925.

H. C. ODEN 1,538,734

MILKING MACHINE APPARATUS

Filed Aug. 27, 1919

Henry Clyde Oden
INVENTOR.

BY
Edwin P. Corbett
ATTORNEY.

Patented May 19, 1925.

1,538,734

UNITED STATES PATENT OFFICE.

HENRY CLYDE ODEN, OF COLUMBUS, OHIO, ASSIGNOR, BY MESNE ASSIGNMENTS, TO PINE TREE MILKING MACHINE COMPANY.

MILKING-MACHINE APPARATUS.

Application filed August 27, 1919. Serial No. 320,097.

*To all whom it may concern:*

Be it known that I, HENRY CLYDE ODEN, a citizen of the United States of America, residing at Columbus, in the county of Franklin and State of Ohio, have invented certain new and useful Improvements in Milking-Machine Apparatus, of which the following is a specification.

My invention relates to milking machine apparatus and has for its aim the provision of a novel manner of mounting the various operating elements of a milking machine so that the work required for the separation of the parts for the purpose of sterilization and cleansing will be reduced to a minimum and so that practically all tendency of the operators to sterilize parts that may be injured thereby will be practically obviated. The successful use of milking machines demands that, when these machines are not in actual operation, those of the parts which come in contact with the milk must be kept in a sterilizing or cleansing fluid. Experience has demonstrated that the class of labor employing these machines will frequently immerse in a sterilizing fluid those parts of the working apparatus which cannot be benefited by sterilization and will in a very short time be ruined by such treatment. For instance, the pulsator which is usually mounted upon the lid of the milk pail will absolutely be rendered inoperative if any extraneous fluid is permitted to enter it. The valve structure necessary in those machines which use a pulsating action will very soon be put out of operation if subjected to the sterilizing fluid.

I have provided a structure wherein the essential working parts of a milking machine, with the exception of the teat cups and source of power, are mounted upon the lid of the milk pail. In my apparatus, these working parts are so mounted that those parts which must be sterilized and those parts which would be injured by sterilization may be separated with minimum difficulty and in such a way that the elements of the parts which need sterilization or cleansing are fully accessible to the sterilizing or cleansing fluid. More specifically, I have provided a milk pail cover which is separable by one operation into two parts, one part being lifted with all of its elements accessible to the sterilizing or cleansing fluid and the other part being movable to any desired point as a single unit.

Furthermore, I have provided a novel form of milk spigot upon the milk pail which is particularly useful in connection with a multiple unit milking machine, in that it comprises a plurality of main milk conduits and a single valve capable of opening or closing either one of these conduits or both of them. In addition, I have provided an aperture in the milk pail cover which is supplemented by a baffle so as to reduce to a minimum all deposits of contaminating material and to prevent the vaporized milk from entering the check valve chamber and clogging the check valve.

The preferred embodiment of my invention is shown in the accompanying drawings wherein similar characters of reference designate corresponding parts and wherein—

Figure 1 is a perspective view showing the manner in which my apparatus is separated and sterilization or cleansing effected by immersion in a sterilizing or cleansing fluid, the pulsator and attached elements being suspended on a hook that may be provided for this purpose.

Figure 2:
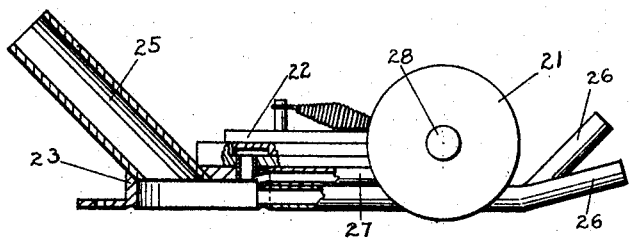
Figure 2 is a side elevation, partially in section, of the pulsator, valve structure and check valve casing which are removed as a unit from the milk pail cover.

In the drawings, the body portion of the cover is shown at 1 as having a flange 2 on its lower side and as being formed with a depression 3 which is surrounded on the upper side of the cover with an upstanding flange 4. This depression 3 is apertured as at 5 and forms a valve seat for the ball valve 6 desirably loosely attached to the cover by means of a chain 7. The portion of the cover immediately surrounding the aperture 5 is depressed as at 3 for several purposes. One reason is that the milk being drawn into the parts by vacuum will vaporize to such an extent that this vapor would otherwise have a tendency to pass upwardly through the aperture 5 and into the check valve chamber, with the result that the check valve seat would in time become coated with a clogging and contaminating paste. As it is, however, the depression 3 serves as a baffle which practically obviates this difficulty.

Figure 4:
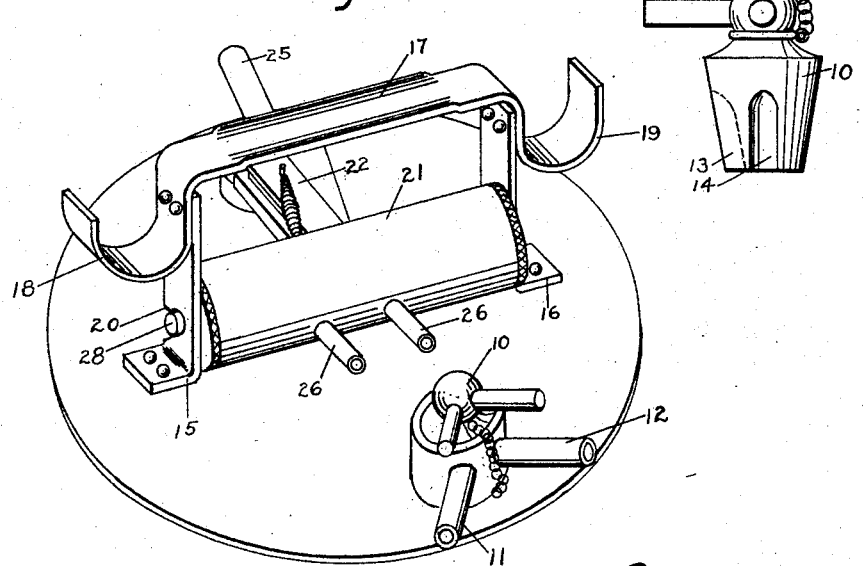
Figure 4 is a perspective view of the milk pail cover with the parts assembled.

At a point diametrically opposite to the depression 3 on the milk pail cover is a spigot casing 8 having a cylindrical exterior and a downwardly and inwardly flared interior 9 forming a seat for the spigot valve 10. By reference to Figures 1 and 4, it will appear that main conduits 11 and 12 extend through the valve casing 8. Communication of these conduits with the interior of the milk pail is under the control of the spigot valve 10 which is provided with spaced clearances or ports 13 and 14. This spigot valve is particularly useful in connection with a double unit milking machine for conduit 11 is connected to one set of teat cups while conduit 12 is connected to another set of teat cups. The spigot valve may be partially rotated so as to open only the conduit 11, in which event only one set of teat cups will be subjected to the vacuum through the milk pail. On the other hand, the spigot valve may be further rotated so as to bring the port 14 into registry with the conduit 12 and the port 13 into registry with the conduit 11, in which event both sets of teat cups will be subjected to vacuum through the milk pail.

Centrally located upon the milk pail cover I have provided a handle structure comprising L-shaped standards 15 and 16 with their short legs riveted to the milk pail cover and with their upper ends riveted to a cross-piece 17. This cross-piece is rounded to provide a hand hold and is further provided with U-shaped extensions 18 and 19 upon which the sets of teat cups may be hung. The vertical legs of the standards 15 and 16 are cut away as at 20.

The structure thus far described comprises a single part of my apparatus and all of the parts are connected together so that they may be immersed in a sterilizing or cleansing fluid as an entirety as shown in Figure 1 of the drawings. None of these parts will be harmed by such immersion and it is desirable to so immerse practically all of them.

The structure which is to be removably connected to the structure thus far described, which structure it is not desirable to sterilize or subject to any liquid, is shown in Figure 2 of the drawings. It comprises a pulsator 21, valve structure 22 and a cylindrical casing element 23 carrying a screw bolt 24 and having a main vacuum conduit 25. This structure also carries the conduits 26 for connection to the pulsating chambers of the teat cups and the conduits for connection to the pulsator, one of these being shown at 27. It will be understood that there are other conduits not shown in these drawings and that all of these are removable with the structure shown. Extending from either end of the cylinder 21 are pintles 28.

Figure 3:
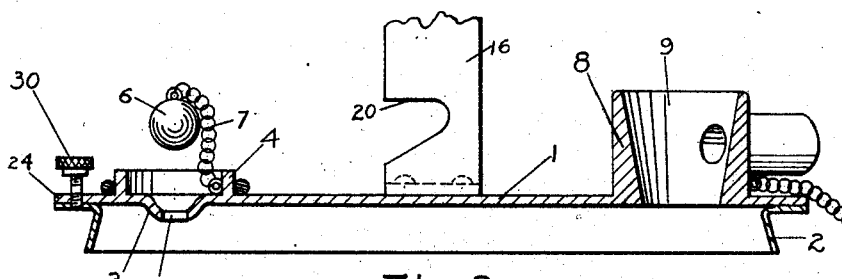
Figure 3 is a vertical transverse section of the milk pail cover ready for immersion.

In assembling, the pintles 28 are placed in the cutaway portions 20 of the members 15 and 16 and the cylindrical member 23 is placed down over the upstanding flange 4 of the cover plate. Then the screw bolt 30 is screwed down into the threaded opening shown in the cover plate with the result that the two parts embodying all of the operating mechanism are held together firmly. In disconnecting the parts for sterilizing or cleansing, it is only necessary to unscrew the bolt 30 and by tilting the structure shown in Figure 2 release the pintles 28 from the cutaway portions 20 of the handle structure. When this is done, the check valve 6 is uncovered and both it and its seat are accessible to the sterilizing or cleansing fluid. It is then desirable to lift out the spigot valve 10 at which time the entire structure shown in Figure 3 may be immersed in the sterilizing or cleansing fluid.

It will be obvious from this description that I have provided an extremely simple mechanism which is comprised, to all intents and purposes, of only two parts. These parts may be separated by a single operation in every practical sense and the operator need only do this and set the parts of Figure 2 to one side while submerging the parts of Figure 3 in a sterilizing or cleansing fluid as shown in Figure 1. With such a structure, there can be no danger of an operator failing to disconnect all of the parts which will be injured by immersion and not only this but all of the parts which are immersed will have every element thereof accessible to the sterilizing fluid. Those parts which are immersed will obviously be those parts which come in contact with the milk in the operation of the milking machine.

Having thus described my invention, what I claim is:

1. In milking machine apparatus, a milk pail cover comprising two separable parts, one part embodying the body of the cover, a check valve and a milk valve casing, and the other part embodying a pulsator, conduit structure, valve structure and the upper portion of the check valve casing, said two parts being separable as units from each other.

2. In milking machine apparatus, a milk pail cover comprising a body portion with an aperture therein, a readily removable superstructure embodying as a single unit, a pulsator and a covering chamber for such aperture and means on the outer surface of said cover for readily receiving and connecting said pulsator unit to the cover, said pulsator being readily removable to permit sterilization of other parts of the apparatus.

In testimony whereof I hereby affix my signature.

HENRY CLYDE ODEN.